(12) United States Patent
Hu et al.

(10) Patent No.: US 10,694,011 B2
(45) Date of Patent: Jun. 23, 2020

(54) SMART LIGHT GUIDE BATTERY COVER AND MOBILE TERMINAL

(71) Applicant: JRD COMMUNICATION (SHENZHEN) LTD, Shenzhen, Guangdong (CN)

(72) Inventors: Zhiguo Hu, Guangdong (CN); Dongshui Su, Guangdong (CN); Benzhi Ye, Guangdong (CN); Huajun Cheng, Guangdong (CN); Ruilin Hou, Guangdong (CN); Xieyuan Lin, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 324 days.

(21) Appl. No.: 15/745,988

(22) PCT Filed: Mar. 31, 2017

(86) PCT No.: PCT/CN2017/079041
§ 371 (c)(1),
(2) Date: Jan. 18, 2018

(87) PCT Pub. No.: WO2018/141131
PCT Pub. Date: Aug. 9, 2018

(65) Prior Publication Data
US 2020/0106869 A1   Apr. 2, 2020

(30) Foreign Application Priority Data
Feb. 3, 2017  (CN) .......................... 2017 1 0063436

(51) Int. Cl.
*H04M 1/02* (2006.01)
*F21V 3/00* (2015.01)
(Continued)

(52) U.S. Cl.
CPC ............. *H04M 1/0283* (2013.01); *F21V 3/00* (2013.01); *F21V 11/14* (2013.01); *F21V 19/003* (2013.01);
(Continued)

(58) Field of Classification Search
CPC .... H04M 1/0283; H04M 1/0262; H04M 1/22; F21V 3/00; F21V 11/14; F21V 19/003
See application file for complete search history.

(56) References Cited

FOREIGN PATENT DOCUMENTS

| CN | 201237163 Y | 5/2009 |
|---|---|---|
| CN | 202027555 | * 11/2011 |

(Continued)

OTHER PUBLICATIONS

Search Report of counterpart European Patent Application No. 17835448.6 dated Oct. 25, 2019.

*Primary Examiner* — Nguyen T Vo

(57) ABSTRACT

A smart light guide battery cover and a mobile terminal are provided. The smart light guide battery cover is arranged above a battery of the mobile terminal, and comprises: at least one LED lamp connected to the battery, a battery rear cover arranged above the at least one LED lamp and capable of transmitting lights, and a light guide film arranged above the battery rear cover and configured to guide the lights. In the present application, the light guide film is applied to the smart battery cover for the first time, and thus the battery cover may guide the lights, meeting the personalized demands of the customer.

14 Claims, 6 Drawing Sheets

(51) Int. Cl.
*F21V 11/14* (2006.01)
*F21V 19/00* (2006.01)
*H04M 1/22* (2006.01)
*F21Y 115/10* (2016.01)

(52) U.S. Cl.
CPC ........... *H04M 1/0262* (2013.01); *H04M 1/22* (2013.01); *F21Y 2115/10* (2016.08)

(56) References Cited

FOREIGN PATENT DOCUMENTS

| | | |
|---|---|---|
| CN | 202178803 U | 3/2012 |
| CN | 202977260 U | 6/2013 |
| CN | 203014918 U | 6/2013 |
| CN | 204442446 U | 7/2015 |
| CN | 205490682 U | 8/2016 |
| KR | 20140062225 A | 5/2014 |
| KR | 20150039031 A | 4/2015 |
| WO | WO03075548 A1 | 9/2003 |

* cited by examiner

SMART LIGHT GUIDE BATTERY COVER AND MOBILE TERMINAL

CROSS-REFERENCE TO RELATED APPLICATIONS

The present application is a 35 U.S.C. § 371 National Phase conversion of International (PCT) Patent Application No. PCT/CN2017/079041 filed Mar. 31, 2017, which claims foreign priority of Chinese Patent Application No. 201710063436.9, filed on Feb. 3, 2017 in the State Intellectual Property Office of China, the contents of all of which are hereby incorporated by reference.

TECHNICAL FIELD

Embodiments of the present disclosure generally relate to battery cover technology, and in particular relate to a smart light guide battery cover and a mobile terminal.

BACKGROUND

Light guide films have already been designed and used in many applications, such as lights of icons on touch screens of smartphones, keypads of feature phones, smart bracelets, tablet computers, and the like. However, at present, there has never been any design to apply the light guide films to smart battery covers, and thus it is impossible to meet personalized demands of users for achieving light guide of the battery covers.

Therefore, the technical solution in the prior art needs to be developed and improved.

SUMMARY

Aiming at defects in the prior art described above, the objective of the present disclosure is to provide a smart light guide battery cover and a mobile terminal, which may solve the technical problems in the prior art that there has never been any design to apply the light guide film on the smart battery cover, and it is impossible to meet personalized demands of users for achieving light guide of the battery covers.

The technical solutions of the present disclosure are as follow.

According to one aspect of the present disclosure, a smart light guide battery cover is provided. The smart light guide battery cover is arranged above a battery of a mobile terminal, and comprises: at least one LED lamp connected to the battery, a battery rear cover arranged above the at least one LED lamp and capable of transmitting lights, a light guide film arranged above the battery rear cover and configured to guide the lights, and a transparent cover arranged above the light guide film; the battery rear cover comprising a body and a light transmitting structure arranged on the body.

According to another aspect of the present disclosure, a smart light guide battery cover is further provided. The smart light guide battery cover is arranged above a battery of a mobile terminal, and comprises: at least one LED lamp connected to the battery, a battery rear cover arranged above the at least one LED lamp and capable of transmitting lights, and a light guide film arranged above the battery rear cover and configured to guide the lights.

According to another aspect of the present disclosure, a mobile terminal is further provided. The mobile terminal comprises the smart light guide battery cover described above.

The present disclosure may have the following advantages: a smart light guide battery cover and a mobile terminal are provided in the present disclosure. The smart light guide battery may include: at least one LED lamp connected to a battery, a battery rear cover arranged above the at least one LED lamp and capable of transmitting lights, and a light guide film arranged above the battery rear cover and configured to guide the lights. In the present disclosure, the light guide film is applied to the smart battery cover for the first time, and thus the battery cover may achieve the light guiding effect, meeting the personalized demands of the customer.

DETAILED DESCRIPTION

A smart light guide battery cover and a mobile terminal will be provided in the present disclosure. In order to make the objective, the technical solution and the effects of the present disclosure more clearly and definitely, the present disclosure will be further described in detail with reference to the drawings and embodiments. It should be understood that, the embodiments described below are only used for explanation, not for limitation.

The smart light guide battery cover of the present disclosure may be arranged above a battery of the mobile phone including but not limited to a mobile phone, a tablet computer, and the like.

Figure 1:
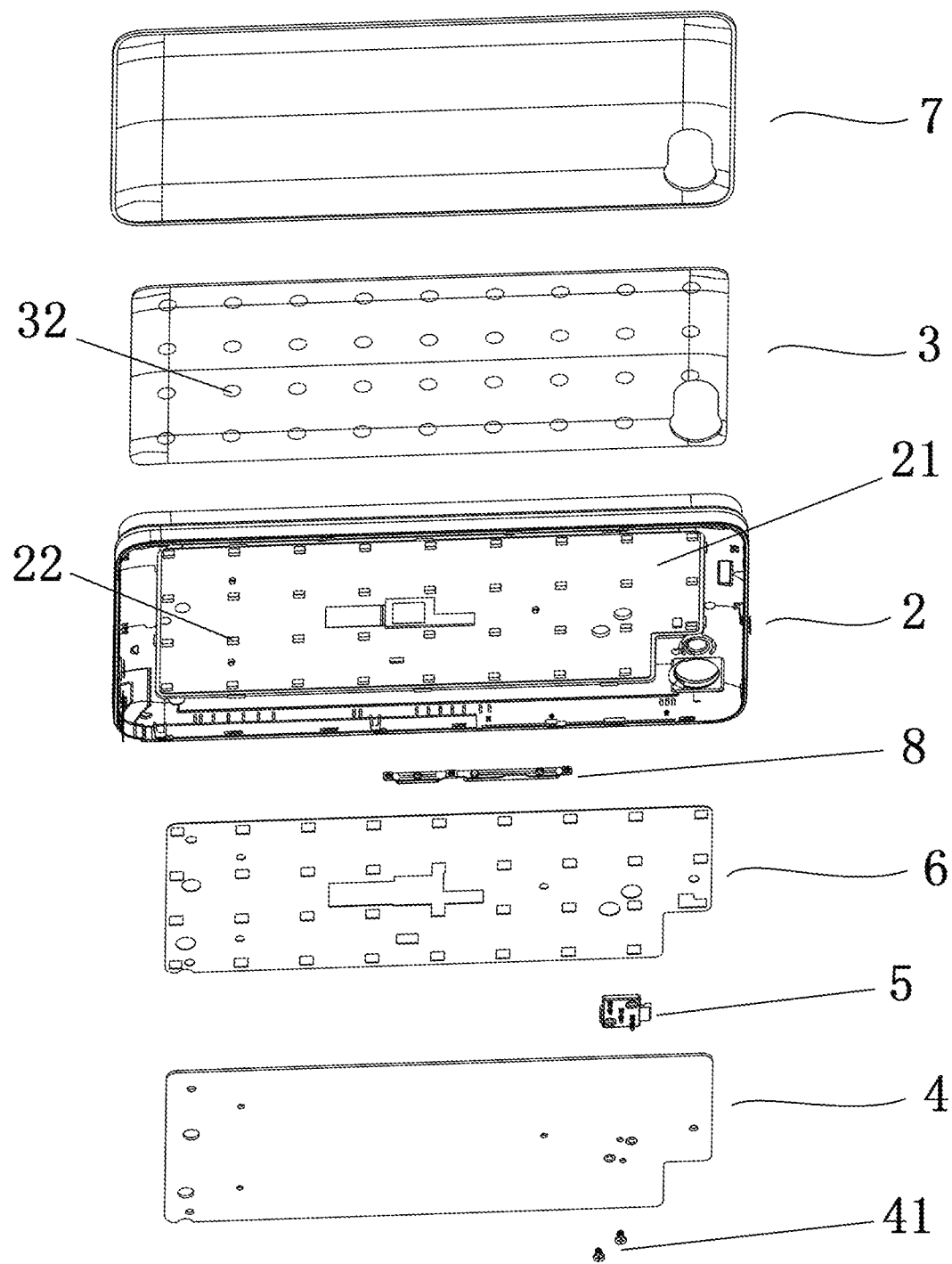
FIG. 1 is an explosive view of a smart light guide battery cover of one embodiment of the present disclosure (the LED light is blocked by the PCB board in the figure because of the angle).
Figure 2:
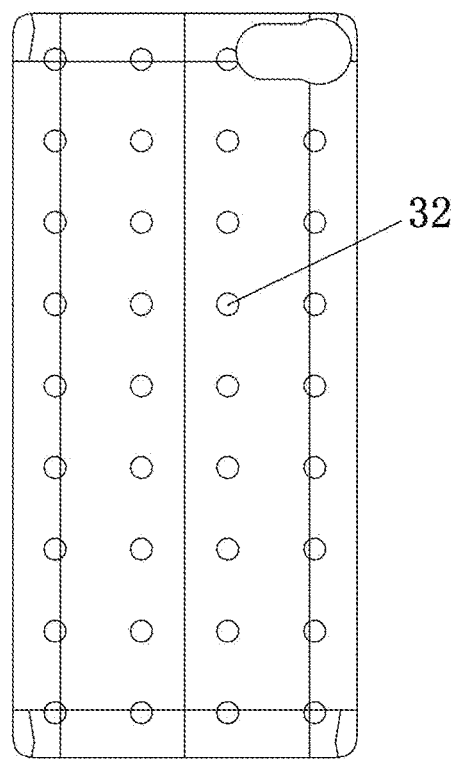
FIG. 2 is a front view of the light guide film of one embodiment of the present disclosure.
Figure 3:
FIG. 3 is a side view of the light guide film of one embodiment of the present disclosure.
Figure 4:
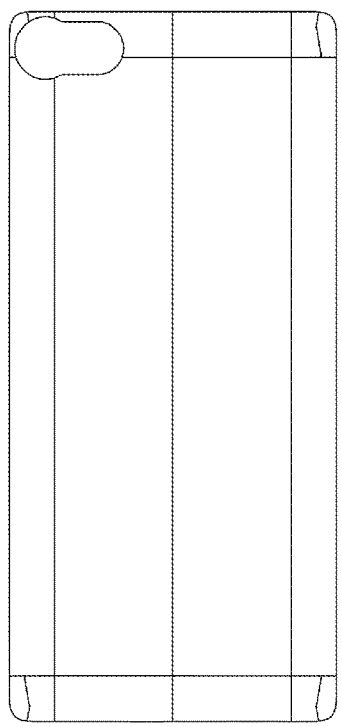
FIG. 4 is a rear view of the light guide film of one embodiment of the present disclosure.
Figure 5:
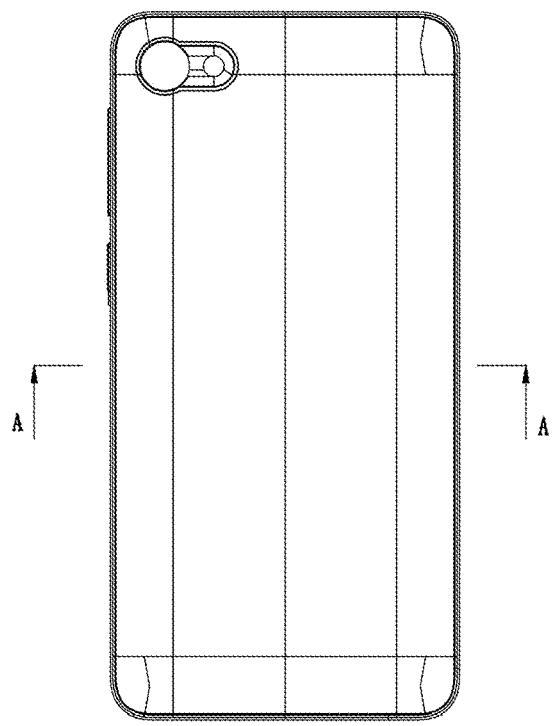
FIG. 5 is a rear view of a mobile phone equipped with the smart light guide battery cover of one embodiment of the present disclosure.
Figure 6:
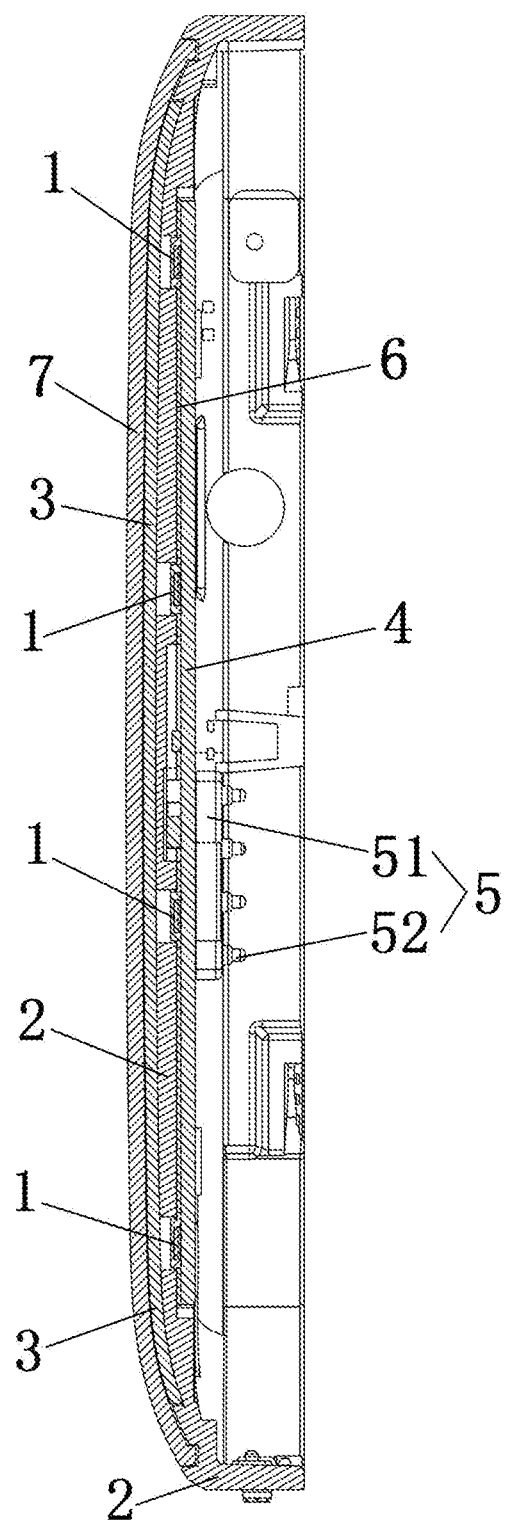
FIG. 6 is a cutaway view along line A-A in FIG. 5 (rotated by 90 degrees anticlockwise).
Figure 7:
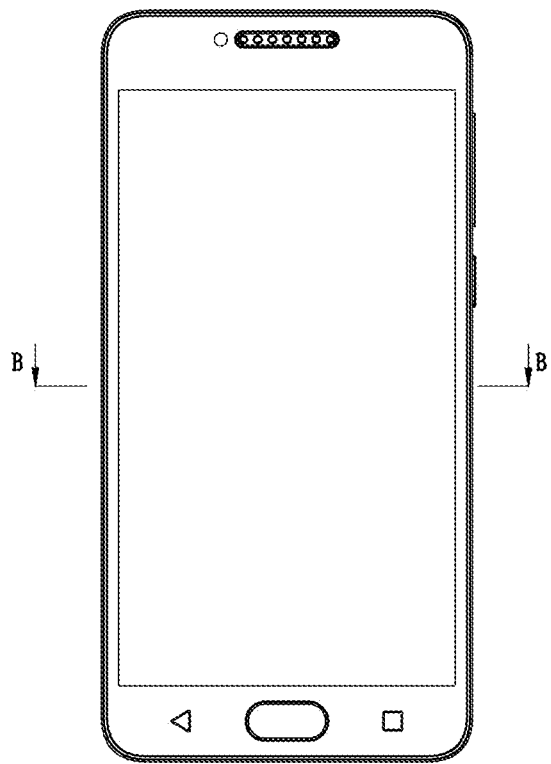
FIG. 7 is a front view of the mobile phone equipped with the smart light guide battery cover of one embodiment of the present disclosure.
Figure 8:
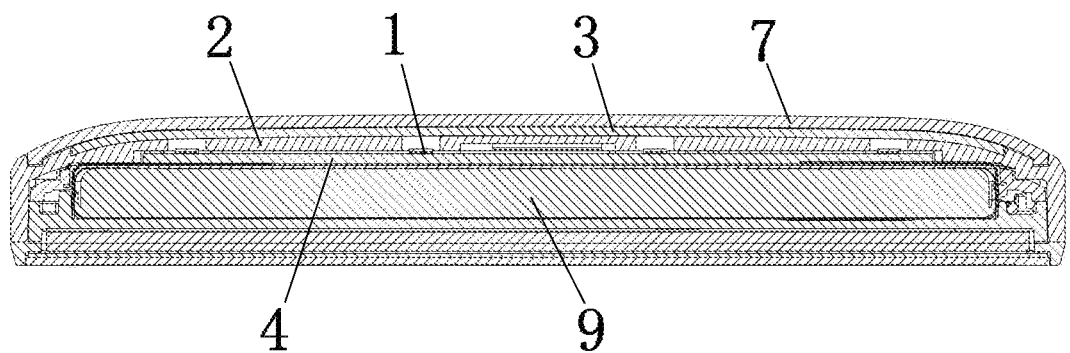
FIG. 8 is a cutaway view along line B-B in FIG. 7.

In one embodiment of the present disclosure, the mobile terminal is described, taking the mobile phone as an example. Referring to FIG. 1, FIG. 6 and FIG. 8, the smart light guide cover may include: at least one LED lamp 1 connected to a battery 9, a battery rear cover 2 arranged above the at least one LED lamp 1 and capable of transmitting lights, and a light guide film 3 arranged above the battery rear cover 2 and configured to guide the lights. In the embodiment of the present disclosure, the battery rear cover 2 is namely the rear cover of the mobile phone.

Optionally, the light guide film of the present disclosure may be implemented as an ultrathin light guide film which may have a thickness of approximately 0.125 mm. Compared with the light guide plate, the light guide film of the present disclosure may occupy smaller space, save LED lamps and power, and have good physical stability, good abrasive resistance, and long lifespan.

Furthermore, as is shown in FIG. 1, in one embodiment of the present disclosure, the battery rear cover 2 may include a body 21 and a light transmitting structure arranged on the body 21. In this case, the light transmitting structure may include at least one light transmitting hole 22 formed on the body 21. The at least one LED lamp 1 may be correspondingly arranged at a lower part of the at least one light transmitting hole 22 arranged on the body 21.

Furthermore, as is shown in FIG. 1, FIG. 2, FIG. 3 and FIG. 4, in one embodiment of the present disclosure, at least one light shielding film 32 may be arranged on the light guide film 3, and the at least one light shielding film 32 may be correspondingly arranged on an upper part of the at least one light transmitting hole 22. Since the at least one LED lamp 1 may be quite close to the light guide film 3, the at least one LED lamp 1 may be blocked by the battery rear cover 2 arranged on two sides of the at least one LED lamp, and lights emitted by the at least one LED lamp 1 may be normally incident into the light guide film 3. In this way, when adding the at least one light shielding film 32 on normal incident positions of the at least one LED lamp 1, parts of the lights may be refracted into the light guide film 3 at the at least one light shielding film 32, and thus lights close to the at least one LED lamp may be evenly diffused.

Furthermore, in one embodiment of the present disclosure, the smart light guide battery cover may further include a conductive structure (not labeled here) arranged at a lower part of the at least one LED lamp 1 and configured to electrically connect at least one LED lamp 1 to the battery 9.

In specific, as is shown in FIG. 1, FIG. 5, FIG. 6 and FIG. 7, in one embodiment of the present disclosure, the conductive structure may include: a PCB board 4 configured to fix the at least one LED lamp 1, and a Pogo pin assembly 5 arranged at a lower part of the PCB board 4 and configured to electrically connect the PCB board 4 to the battery 9.

More specifically, as is shown in FIG. 6, in one embodiment of the present disclosure, the Pogo pin assembly 5 may include: a Pogo pin support 51 arranged at the lower part of the PCB board 4, and a plurality of Pogo pins 52 arranged on the Pogo pin support 51. The Pogo pin is namely POGO PIN, which is a kind of precise connector applied to electronic products such as mobile phone, and which is widely used in semiconductor devices for connection. The Pogo pin belongs to a technical solution of prior art, and will not be described in detail any more.

Figure 9:
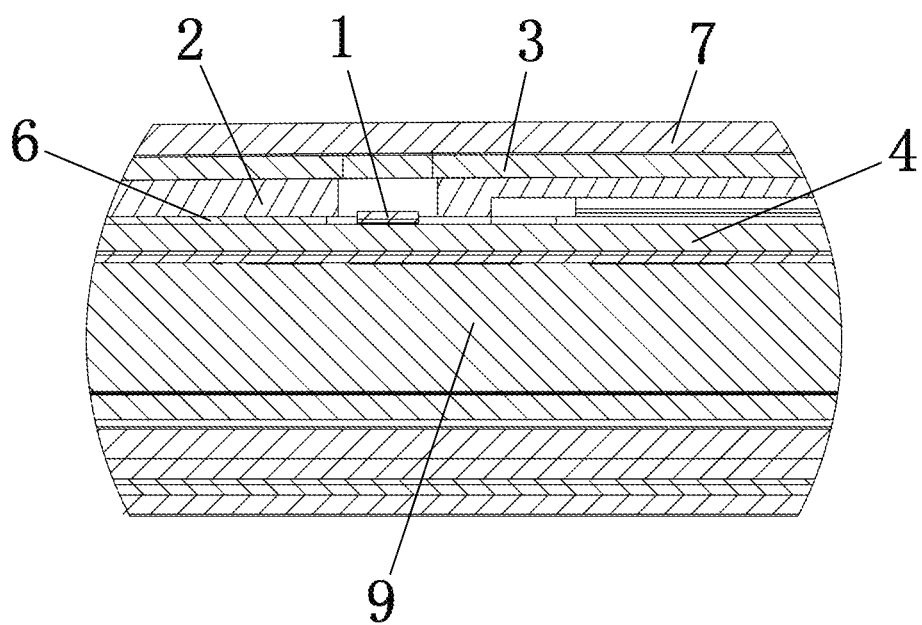
FIG. 9 is a partially enlarged view of FIG. 8.

In specific, as is shown in FIG. 1, FIG. 6 and FIG. 9, in one embodiment of the present disclosure, the smart light guide battery cover may further include a foam 6 arranged between the PCB board 4 and the battery rear cover 2. The foam 6 may have functions of damping the battery, fixing the PCB board, and anti-vibrating, and may protect the battery and the PCB board as a result.

Furthermore, as is shown in FIG. 1, FIG. 6 and FIG. 8, in one embodiment of the present disclosure, the smart light guide battery cover may further include a transparent cover 7 arranged above the light guide film 3.

Optionally, in one embodiment of the present disclosure, the transparent cover 7 is an IML black transparent rear cover. IML (In Molding Label) is namely in-mold decoration process which may have the following significant features: a layer of hardened transparent thin film is positioned on the surface, a layer of plastic is positioned on the back, and a layer of printed pattern is sandwiched between the layer of hardened transparent thin film and the layer of plastic. Since printing ink is sandwiched in the middle between the layer of hardened transparent thin film and the layer of plastic in this embodiment, the surface of product may be prevented from being scratched; the product may have high frictional resistance, keep colors bright and not easily fade for a long period of time. When using the IML black transparent rear cover in the present disclosure, it is possible to achieve more gorgeous and colorful light guiding effect, and better meet personalized demands of users for diversification of light colors.

Furthermore, as is shown in FIG. 1, in one embodiment of the present disclosure, the smart light guide battery cover may further include a side key 8 (i.e., the side key of the mobile phone) assembled on the battery rear cover 2, and a bolt 41 configured to fix the Pogo pin support 51 on the PCB board 4.

In the embodiment of the present disclosure, the smart light guide battery cover may mainly comprise components such as the PCB board, the at least one LED lamp, the light guide film, the Pogo Pin, the Pogo Pin support, the battery rear cover, the IML black transparent rear cover, the foam, and the like. The light guide film may be attached on the battery rear cover. The lights emitted from the at least one LED lamp may be refracted to the light guide film, evenly diffused via the light guide film, passed through the IML black transparent rear cover, and finally diverged. In this way, it is possible to achieve a function of illumination.

In the present disclosure, the light guide film may be directly attached on the battery rear cover, and the components including the PCB board, the at least one LED lamp, the Pogo Pin, and the like are connected to each other. In this way, the circuit may be keep conducted, and the battery cover may achieve the light guiding effect.

In the present disclosure, the light guide film is creatively applied to the smart battery cover, and thus the battery cover may achieve the light guiding effect, meeting the personalized demands of the customer, and may be the pioneering technology in the industry.

In another embodiment of the present disclosure, a mobile terminal may be further provided. The mobile terminal may include the smart light guide battery cover described above. In this embodiment, the mobile terminal may include but not limit to a mobile phone, a tablet computer, and the like.

In conclusion, the present disclosure provides a smart light guide battery cover and a mobile terminal. The smart light guide battery may include: at least one LED lamp connected to a battery, a battery rear cover arranged above the at least one LED lamp and capable of transmitting lights, and a light guide film arranged above the battery rear cover and configured to guide the lights. In the present disclosure, the light guide film is applied to the smart battery cover for the first time, and thus the battery cover may achieve the light guiding effect, meeting the personalized demands of the customer.

It could be understood that, the application of the present disclosure may not be limited to the embodiments described above. In fact, one skilled in the art may make many equivalents and modifications based on the technical solutions and inventive concept of the present disclosure. All these equivalents and modifications shall all be covered within the protection of the disclosure.

What is claimed is:

1. A smart light guide battery cover, arranged above a battery of a mobile terminal, comprising:
   at least one LED lamp connected to the battery,
   a battery rear cover capable of transmitting light and comprising a body and a light transmitting structure arranged on the body; wherein the light transmitting structure comprises at least one light transmitting hole formed on the body, and the at least one LED lamp is correspondingly arranged in the at least one light transmitting hole, a light guide film arranged above the battery rear cover and the at least one LED lamp, covering the battery rear cover and the at least one LED lamp, and configured to guide the light, and a transparent cover arranged above the light guide film.

2. The smart light guide battery cover of claim 1, wherein at least one light shielding film is arranged on the light guide film; the at least one light shielding film is correspondingly arranged on an upper part of the at least one light transmitting hole and covering the at least one LED lamp and the at least one light transmitting hole, and the at least one shielding film is configured to refract a portion of the light emitted from the at least one LED lamp into the light guide film.

3. The smart light guide battery cover of claim 1, further comprising a conductive structure arranged at a lower part of the at least one LED lamp and configured to electrically connect the at least one LED lamp to the battery.

4. The smart light guide battery cover of claim 3, wherein the conductive structure comprises a PCB board configured to fix the at least one LED lamp, and a Pogo pin assembly arranged at a lower part of the PCB board and configured to electrically connect the PCB board to the battery.

5. The smart light guide battery cover of claim 1, wherein a projection of the at least one LED lamp projected on the battery rear cover is located within the at least one light transmitting hole.

6. The smart light guide battery cover of claim 1, further comprising a PCB board configured to fix the at least one LED lamp, wherein the PCB board is arranged at one side of the battery rear cover that faces away from the light guide film;

the PCB board, the battery rear cover, and the light guide film cooperatively define a space configured to receive the at least one LED lamp.

7. A smart light guide battery cover, arranged above a battery of a mobile terminal, comprising:

at least one LED lamp connected to the battery, a battery rear cover capable of transmitting light and comprising a body and at least one light transmitting hole defined in the body;

wherein the at least one LED lamp is correspondingly arranged in the at least one light transmitting hole, and a light guide film arranged above the battery rear cover and the at least one LED lamp, covering the battery rear cover and the at least one LED lamp, and configured to guide the light.

8. The smart light guide battery cover of claim 7, wherein at least one light shielding film is arranged on the light guide film; the at least one light shielding film is correspondingly arranged on an upper part of the at least one light transmitting hole and covering the at least one LED lamp, and the at least one shielding film is configured to refract a portion of the light emitted from the at least one LED lamp into the light guide film.

9. The smart light guide battery cover of claim 7, further comprising a conductive structure arranged at a lower part of the at least one LED lamp and configured to electrically connect the at least one LED lamp to the battery.

10. The smart light guide battery cover of claim 9, wherein the conductive structure comprises a PCB board configured to fix the at least one LED lamp, and a Pogo pin assembly arranged at a lower part of the PCB board and configured to electrically connect the PCB board to the battery.

11. The smart light guide battery cover of claim 9, further comprising a foam arranged between the PCB board and the battery rear cover.

12. The smart light guide battery cover of claim 7, further comprising a transparent cover arranged above the light guide film.

13. A mobile terminal, comprising the smart light guide battery cover of claim 7.

14. The mobile terminal of claim 13, wherein at least one light shielding film is arranged on the light guide film; the at least one light shielding film is correspondingly arranged on an upper part of the at least one light transmitting hole and covering the at least one LED lamp, and the at least one shielding film is configured to refract a portion of the light emitted from the at least one LED lamp into the light guide film.

* * * * *